United States Patent
Trujillo et al.

(10) Patent No.: US 12,418,831 B2
(45) Date of Patent: Sep. 16, 2025

(54) USAGE OF WIRELESS TELECOMMUNICATION SERVICE PROVIDER AUTONOMOUS SYSTEM NUMBER (ASN) IN A CLOUD-NATIVE WIRELESS TELECOMMUNICATION NETWORK

(71) Applicant: DISH WIRELESS L.L.C., Englewood, CO (US)

(72) Inventors: Andrew Trujillo, Littleton, CO (US); Ash Khamas, Goffstown, NH (US); Sundeep Goswami, Leesburg, VA (US)

(73) Assignee: DISH Wireless L.L.C., Englewood, CO (US)

( * ) Notice: Subject to any disclaimer, the term of this patent is extended or adjusted under 35 U.S.C. 154(b) by 349 days.

(21) Appl. No.: 18/134,410

(22) Filed: Apr. 13, 2023

(65) Prior Publication Data

US 2023/0337055 A1 Oct. 19, 2023

Related U.S. Application Data

(60) Provisional application No. 63/331,210, filed on Apr. 14, 2022.

(51) Int. Cl.
| | |
|---|---|
| *H04W 28/08* | (2023.01) |
| *H04L 12/46* | (2006.01) |
| *H04W 28/084* | (2023.01) |
| *H04W 28/086* | (2023.01) |

(52) U.S. Cl.
CPC ..... *H04W 28/084* (2023.05); *H04W 28/0846* (2020.05); *H04W 28/0864* (2023.05); *H04W 28/0892* (2020.05)

(58) Field of Classification Search
None
See application file for complete search history.

(56) References Cited

U.S. PATENT DOCUMENTS

| | | | | |
|---|---|---|---|---|
| 9,749,224 | B2 * | 8/2017 | Bitar | H04L 45/308 |
| 10,819,630 | B1 * | 10/2020 | Panchal | H04L 45/586 |
| 11,588,731 | B1 * | 2/2023 | Teng | H04L 61/2514 |

(Continued)

*Primary Examiner* — Alpus Hsu
(74) *Attorney, Agent, or Firm* — Jeremiah J. Baunach; Frontier IP Law PLLC

(57) ABSTRACT

Example embodiments are directed towards systems and methods for a fifth generation (5G) cloud-native wireless telecommunication network operated by a mobile network operator (MNO) implemented on a public cloud of a cloud computing service provider. Such a method may include the MNO operating telecommunication network functions (NFs) of the 5G wireless telecommunication network running within the public cloud. An indication may be received that one or more of the NFs of the 5G wireless telecommunication network running within the public cloud has a requirement to connect to another communication service provider (CSP) network different than the 5G cloud-native wireless telecommunication network operated by the MNO. Based on the indication, the system causes an autonomous system number (ASN) of the MNO to be used for network traffic from the one or more NFs to the other CSP network instead of an ASN of the cloud computing service providers.

9 Claims, 5 Drawing Sheets

(56) References Cited

U.S. PATENT DOCUMENTS

| | | | |
|---|---|---|---|
| 11,711,727 B1* | 7/2023 | Gupta | H04W 76/11 |
| | | | 370/329 |
| 2022/0038554 A1* | 2/2022 | Merwaday | H04L 45/64 |
| 2022/0311744 A1* | 9/2022 | Shevade | G06F 9/45558 |
| 2022/0353732 A1* | 11/2022 | Filippou | H04W 28/0289 |
| 2022/0368613 A1* | 11/2022 | Darji | G06F 9/5005 |
| 2023/0081673 A1* | 3/2023 | Junkins | H04W 24/08 |
| | | | 370/235 |
| 2023/0100729 A1* | 3/2023 | Kostic | H04L 47/76 |
| | | | 370/230 |

* cited by examiner

USAGE OF WIRELESS TELECOMMUNICATION SERVICE PROVIDER AUTONOMOUS SYSTEM NUMBER (ASN) IN A CLOUD-NATIVE WIRELESS TELECOMMUNICATION NETWORK

TECHNICAL FIELD

The present disclosure relates generally to telecommunication networks, more particularly, to usage of a wireless telecommunication service provider ASN in a cloud-native 5G wireless telecommunication network.

BRIEF SUMMARY

A cloud-native 5G wireless network of a telecommunication service provider, such as a mobile network operator (MNO) may often need to interconnect with networks of other communication service providers (CSPs). However, although the cloud-native 5G wireless network has network functions (NFs), also referred to as workloads, operating within the public cloud of a cloud computing service provider, another CSP network may have a requirement that the MNO use the autonomous system number (ASN) of the MNO instead of the ASN of the cloud computing service provider in order for the MNO to interconnect with the other CSP network. It is with respect to these and other considerations that the embodiments described herein have been made.

5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible and virtualized RAN with interfaces creating additional data access points.

5G network functions may be completely software-based and designed as cloud-native, meaning that they're agnostic to the underlying cloud infrastructure, allowing higher deployment, agility and flexibility. With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in cloud computing that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which implements IT network principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises of a set of radio base stations (each known as Next Generation Node B (gNb)) connected to the 5G core (5GC) and to each other. The gNb incorporates three main functional modules: the Centralized Unit (CU), the Distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called as microservices.

Embodiments, described herein may use containerization to implement such microservices. Containerization is the packaging of software code with just the operating system (OS) libraries and dependencies required to run the code to create a single lightweight executable (a container) that runs consistently on any infrastructure. Software platforms, such as Kubernetes, manage containerized workloads and automate the deployment, scaling, and management of containerized applications. Compared to virtual machines (VMs) containers have relaxed isolation properties to share the Operating System (OS) among the applications. Therefore, containers are considered lightweight. A container has its own file system, share of CPU, memory and process space. As they are decoupled from the underlying infrastructure, they are portable across clouds and OS distributions.

A cluster is made up of nodes that run containerized applications. Each cluster also has a master (control plane) that manages the nodes and pods of the cluster. A node represents a single machine in a cluster, typically either a physical machine or virtual machine that's located either on-premises or hosted by a cloud service provider. Each node hosts groups of one or more containers (which run applications), and the master communicates with nodes about when to create or destroy containers and how to re-route traffic based on new container alignments. The Kubernetes master is the access point (or the control plane) from which administrators and other users interact with the cluster to manage the scheduling and deployment of containers.

A pod is the basic unit of scheduling for applications running on a cluster. The applications are running in containers, and each pod comprises one or more container(s). While pods are able to house multiple containers, one-container-per-pod may also be used. In some situations, containers that are tightly coupled and need to share resources may sit in the same pod. Pods can quickly and easily communicate with one another as if they were running on the same machine. They do still, however, maintain a degree of isolation. Each pod is assigned a unique IP address within the cluster, allowing the application to use ports without conflict.

Pods are designed as relatively ephemeral, disposable entities. When a pod gets created, it is scheduled to run on a node. The pod remains on that node until the process is terminated, the pod object is deleted, the pod is evicted for lack of resources, or the node fails. In Kubernetes, pods are the unit of replication. If an application becomes overly popular and a pod can no longer facilitate the load, Kubernetes can deploy replicas of the pod to the cluster.

Software container orchestration platforms, such as Amazon Elastic Kubernetes Service (Amazon EKS), are services for users to run Kubernetes on the cloud of a cloud computing service provider, such as Amazon Web Services (AWS), without the user needing to install, operate, and maintain their own Kubernetes control plane or nodes. An Amazon EKS cluster comprises of two primary components: the Amazon EKS control plane and Amazon EKS nodes that are registered with the control plane. The Amazon EKS control plane comprises of control plane nodes that run the Kubernetes software and the Kubernetes application programming interface (API) server. The control plane may run in an account managed by AWS or the telecommunication service provider, and the Kubernetes API is exposed via the Amazon EKS endpoint associated with the cluster. Each Amazon EKS cluster control plane is single-tenant and unique, and runs on its own set of Amazon Elastic Compute Cloud (EC2) instances, which provide scalable computing capacity in the Amazon Web Services (AWS) cloud. However, other types of cloud compute instances or virtual machine instances may be used on various other cloud computing provider service platforms. The cluster control plane may be provisioned across multiple Availability Zones (AZs) and fronted by an Elastic Load Balancing Network Load Balancer. Amazon EKS may also provision elastic network interfaces in VPC subnets to provide connectivity from the control plane instances to the nodes. Amazon EKS nodes may run in an AWS account of the telecommunication service provider and connect to the telecommunication service provider's cluster control plane via the API server endpoint and a certificate file that is created for the cluster.

As disclosed herein, NFs of the 5G NR cellular telecommunication network implemented in respective node groups are useful mechanisms for creating pools of resources in the 5G network that can enforce scheduling requirements. They also provide a utility for shifting workloads around in the 5G network during cluster management and updates. Such NFs of the 5G NR cellular telecommunication network may be hosted on a cloud service provider cloud and referred to herein as cloud-native network functions (CNFs).

As mentioned above, although the cloud-native 5G wireless network has network functions NFs, also referred to as workloads, operating within the public cloud of a cloud computing service provider, another CSP network may have a requirement that the MNO use the autonomous system number (ASN) of the MNO instead of the ASN of the cloud computing service provider in order for the MNO to interconnect with the other CSP network.

Briefly described, embodiments disclosed herein are directed to systems and methods for a fifth generation (5G) cloud-native wireless telecommunication network operated by a mobile network operator (MNO) implemented on a public cloud of a cloud computing service provider. Such a method may include the MNO operating telecommunication network functions (NFs) of the 5G wireless telecommunication network running within the public cloud. An indication may be received that one or more of the NFs of the 5G wireless telecommunication network running within the public cloud has a requirement to connect to another communication service provider (CSP) network different than the 5G cloud-native wireless telecommunication network operated by the MNO. Based on the indication, the system causes an ASN of the MNO to be used for network traffic from the one or more NFs to the other CSP network instead of an ASN of the cloud computing service provider.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
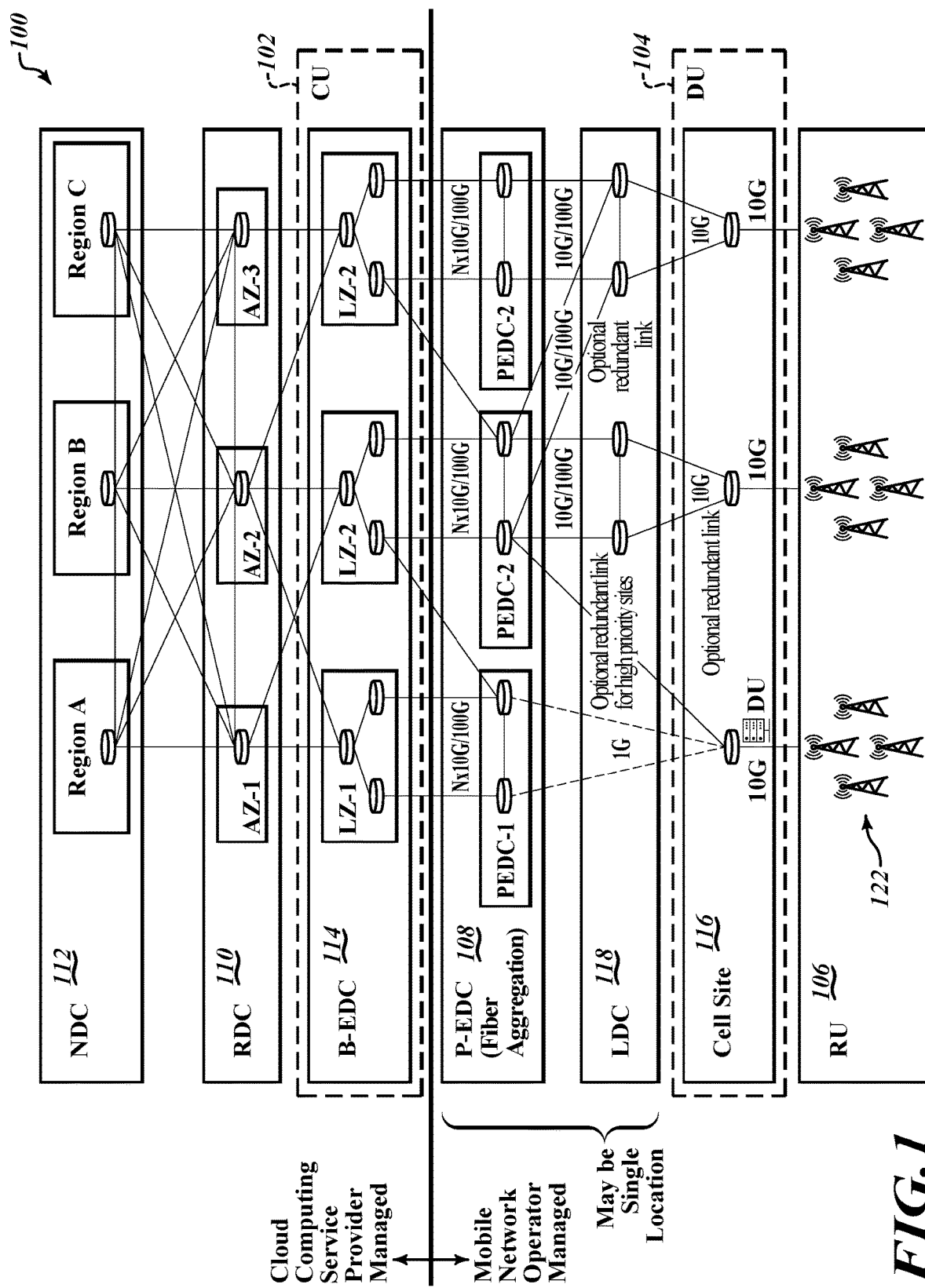
FIG. 1 illustrates a diagram of an example system architecture overview of a system in which usage of a wireless telecommunication service provider ASN in a cloud-native 5G wireless telecommunication network may be implemented in accordance with embodiments described herein.

FIG. 1 illustrates a diagram of an example system architecture overview of a system 100 in which usage of a wireless telecommunication service provider ASN in a cloud-native 5G wireless telecommunication network may be implemented in accordance with embodiments described herein.

The system 100 illustrates an example architecture of at least one wireless network of a mobile network operator (MNO) that is operated and/or controlled by the MNO. The system may comprise a 5G wireless cellular telecommunication network including a disaggregated, flexible and virtual RAN with interfaces creating additional data access points and that is not constrained by base station proximity or complex infrastructure. As shown in FIG. 1, a 5G RAN is split into DUs (e.g., DU 104) that manage scheduling of all the users and a CU 102 that manages the mobility and radio resource control (RRC) state for all the UEs. The RRC is a layer within the 5G NR protocol stack. The CU 102 is hosted within one or more local zones of the cloud computing service provider. For example, local zone 1 (LZ-1) 124. A local zone is a type of infrastructure deployment of the cloud computing service provider that places compute, storage, database, and/or other select cloud computing services closer to end users of the services and systems hosted by cloud computing service provider (e.g., closer to large population and industry centers). Local zones enable users of the cloud computing service provider cloud to use select cloud computing services, like compute and storage services, closer to more end-users, providing them very low latency access to the applications running locally. Local Zones are also connected to the parent region (e.g., Region A 130, Region B 132 and/or Region C 134 shown in FIG. 1) via the cloud service provider's redundant and very high bandwidth private network, giving applications running in local zones fast, secure, and seamless access to the rest of the cloud computing services.

As shown in FIG. 1, the radio unit (RU) 106 converts radio signals sent to and from the antenna of base stations 122 into a digital signal for transmission over packet networks. It handles the digital front end (DFE) and the lower physical (PHY) layer, as well as the digital beamforming functionality.

The DU 104 may sit close to the RU 106 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNb functions, depending on the functional split option, and its operation is controlled by the CU 102.

The CU 102 is the centralized unit that runs the RRC and Packet Data Convergence Protocol (PDCP) layers. A gNb may comprise a CU and one DU connected to the CU via Fs-C and Fs-U interfaces for control plane (CP) and user plane (UP) respectively. A CU with multiple DUs will support multiple gNbs. The split architecture enables a 5G network to utilize different distribution of protocol stacks between CU 102 and DU 104 depending on midhaul availability and network design. The CU 102 is a logical node that includes the gNb functions like transfer of user data, mobility control, RAN sharing, positioning, session management etc., with the exception of functions that may be allocated exclusively to the DU 104. The CU 102 controls the operation of several DUs 104 over the midhaul interface.

As mentioned above, 5G network functionality is split into two functional units: the DU 104, responsible for real time 5G layer 1 (L1) and 5G layer 2 (L2) scheduling functions, and the CU 102 responsible for non-real time, higher L2 and 5G layer 3 (L3). As shown in FIG. 1, the DU's server and relevant software may be hosted on a cell site 116 itself or can be hosted in an edge cloud (local data center (LDC) 118 or central office) depending on transport availability and fronthaul interface. DUs from multiple cell sites may be pooled and col-located at one LDC 118. The CU's server and relevant software may be hosted in a regional cloud data center or, as shown in FIG. 1, in a breakout edge data center (B-EDC) 114. As shown in FIG. 1, the DU 104 may be provisioned to communicate via a pass-through edge data center (P-EDC) 108. The P-EDC 108 may provide a direct circuit fiber connection from the DU directly to the primary physical data center (e.g., B-EDC 114) hosting the CU 102. In some embodiments, the LDC 118, P-EDC 108 and/or the B-EDC 114 may be co-located or in a single location. Cell sites of the base stations 122 connect to the cloud on which the cloud-native 5G wireless network operates via the pass-through edge data center 108 and breakout edge data center 114 comprising MNO managed and controlled routers, such as router 142, connected to MNO virtual routers (vRouters) within the public cloud, such vRouter 140.

The CU 102 may be connected to a regional cloud data center(s) (RDC) 110, which in turn may be connected to a national cloud data center (NDC) 112. In the example embodiment, the P-EDC 108, the LDC 118, the cell site 116 and the RU 106 may all be managed and/or controlled by the mobile network operator and the B-EDC 114, the RDC 110 and the NDC 112 may all be managed and/or hosted by a cloud computing service provider. In some embodiments, the P-EDC 108, LDC 118 and cell site 116 may be at a single location or facility (e.g., a colocation data center). In other embodiments, the B-EDC 114, the P-EDC 108, the LDC 118 and cell site 116 may be at a single location or facility (e.g., a colocation data center). According to various embodiments, the actual split between DU and RU may be different depending on the specific use-case and implementation.

Figure 2:
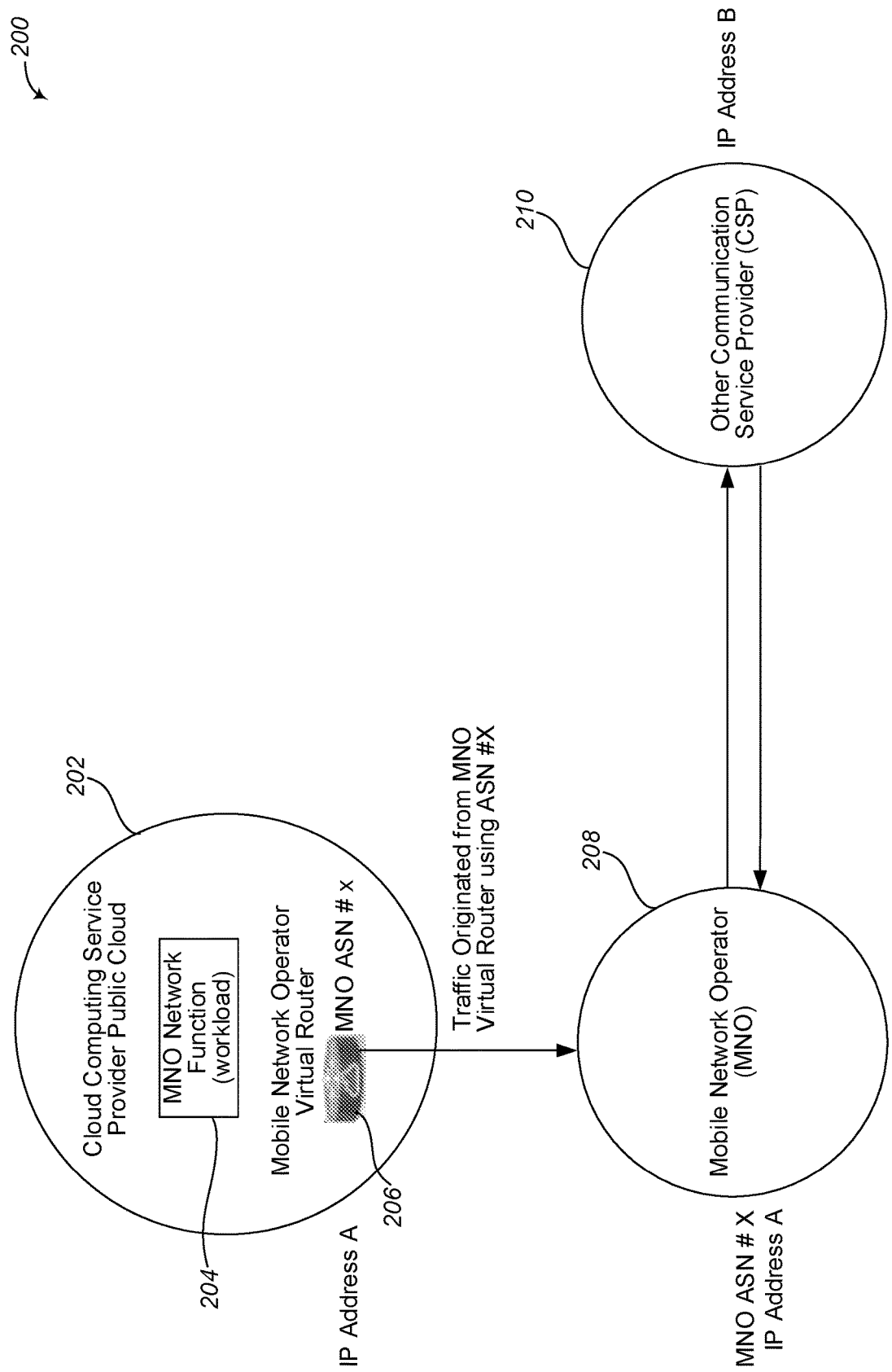
FIG. 2 is a diagram of a system, which may be implemented within the system architecture of the system shown in FIG. 1, for usage of a wireless telecommunication service provider ASN in a cloud-native 5G wireless telecommunication network in accordance with an embodiment described herein.

FIG. 2 is a diagram of a system 200, which may be implemented within the system architecture of the system shown in FIG. 1, for usage of a wireless telecommunication service provider ASN in a cloud-native 5G wireless telecommunication network in accordance with an embodiment described herein.

An Autonomous System (AS) is a group of one or more IP prefixes (lists of IP addresses accessible on a network) run by one or more network operators that maintain a single, clearly-defined routing policy. Network operators need Autonomous System Numbers (Assn) to control routing within their networks and to exchange routing information with other communication service providers (CSPs), which may include other wireless and landline telecommunication service providers, other mobile network operators, voice over IP (VoIP) service providers, Internet Service Providers (ISPs), cable and satellite communications providers that own their own infrastructure, content providers and cloud communications providers, etc. There are two different formats to represent ASNs: 2-byte and 4-byte. A 2-byte ASN is a 16-bit number. This format provides for 65,536 ASNs (0 to 65535). From these ASNs, the Internet Assigned Numbers Authority (IANA) reserved 1,023 of them (64512 to 65534) for private use. A 4-byte ASN is a 32-bit number. This format provides for 232 or 4,294,967,296 ASNs (0 to 4294967295). IANA reserved a block of 94,967,295 ASNs (4200000000 to 4294967294) for private use. Up until the Internet Engineering Task Force (IETF) proposed a gradual transition to 4-byte ASNs in 2007, all ASNs were 2-byte. There is no longer a distinction between a 2-byte and 4-byte ASN, and all ASNs should be considered 4-bytes.

Shown is a cloud computing service provider cloud 202 within which a 5G cloud-native wireless telecommunication network operated by MNO 208, such as that implemented within the architecture of the system 100 of FIG. 1, may be implemented. In an example embodiment, the cloud-native 5G wireless network of the MNO 208, may often need to interconnect with networks of other CSPs, such as CSP 210. However, although the cloud-native 5G wireless network has network functions NFs, such as NF 204, (also referred to as workloads) operating within the public cloud 202 of a cloud computing service provider, another CSP network, such as that of CSP 210, may have a requirement that, in order for the MNO 208 to interconnect with the other CSP network, the MNO must use the ASN of the MNO 208 instead of the ASN of the cloud computing service provider that provides the public cloud 202.

In an example embodiment, the MNO 208 receives an indication that workload 204 of the 5G wireless telecommunication network running within the public cloud 202 has a requirement to connect to another CSP network, such as that of CSP 210, different than the 5G cloud-native wireless telecommunication network operated by the MNO 208. Based on this indication, the MNO 208 causes the ASN of the MNO to be used for network traffic from the workload 204 to the other CSP network of CSP 210 instead of an ASN of the cloud computing service provider. For example, the MNO 208 may do this by causing network traffic from the workload 204 running within the public cloud 202 to be routed to a virtual router (vRouter) 206 controlled by the MNO 208 within the public cloud 202 of the cloud computing service provider. In one embodiment, the vRouter 206 may be the vRouter 140 of FIG. 1.

The MNO 208 causes the network traffic from the workload 204 received at the vRouter 206 to be originated from the vRouter 206 that is controlled by the MNO 208. This causes the ASN of the MNO (e.g., ASN #x) to be used for network traffic from workload 204 to the network of the other CSP 210 instead of an ASN of the cloud computing service provider. The MNO 208 may then route the network traffic from the workload 204 originated from the vRouter 206 to the network of the other CSP 210 using the ASN of the MNO 208 via one or more routers controlled by the MNO 208 that are connected to, but outside, the public cloud 202 of the cloud computing service provider. Network traffic may be also received from the CSP 210 via this same route.

Figure 3:
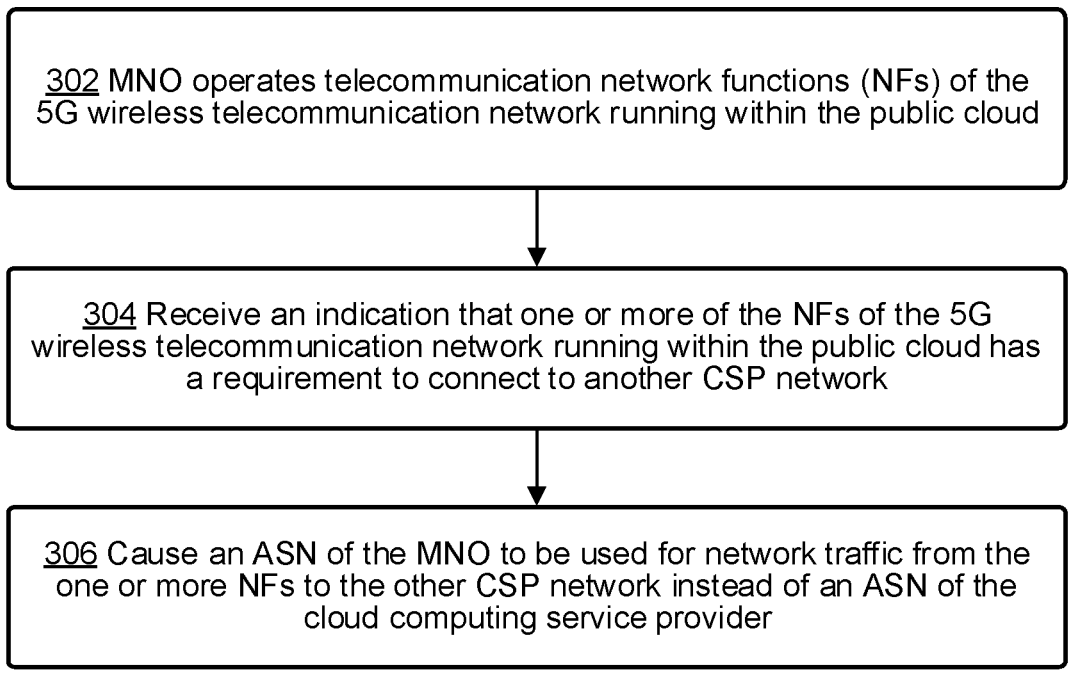
FIG. 3 illustrates a logical flow diagram showing an example embodiment of a process for overcoming for usage of a wireless telecommunication service provider ASN in a cloud-native 5G wireless telecommunication network in accordance with embodiments described herein.

FIG. 3 illustrates a logical flow diagram showing an example embodiment of a process 300 for overcoming for usage of a wireless telecommunication service provider ASN in a cloud-native 5G wireless telecommunication network in accordance with embodiments described herein. Shown is a method in a 5G cloud-native wireless telecommunication network operated by the MNO 208 implemented on a public cloud of a cloud computing service provider.

At 302, the MNO 208 operates telecommunication network functions (NFs) of the 5G wireless telecommunication network running within the public cloud.

At 304, the MNO 208 receives an indication that one or more of the NFs of the 5G wireless telecommunication network running within the public cloud has a requirement to connect to another communication service provider (CSP) network different than the 5G cloud-native wireless telecommunication network operated by the MNO.

At 306, based on the indication, the MNO 208 causes an autonomous system number (ASN) of the MNO to be used for network traffic from the one or more NFs to the other CSP network instead of an ASN of the cloud computing service provider.

Figure 4:
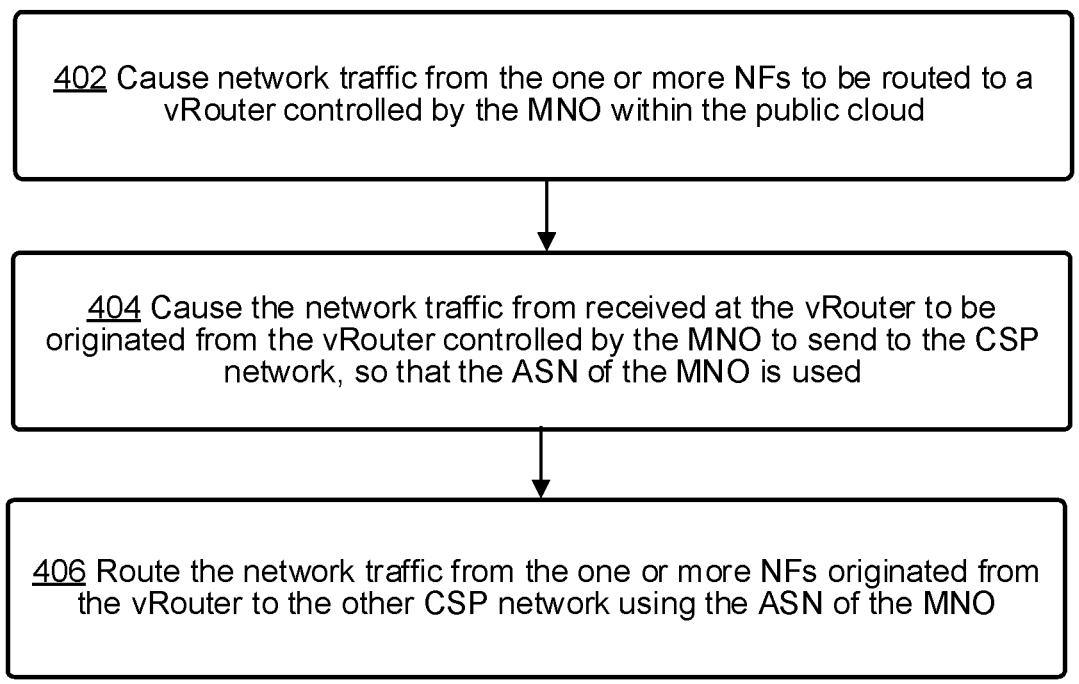
FIG. 4 illustrates a logical flow diagram showing an example embodiment of a process, useful in the process of FIG. 3, for causing the ASN of the MNO to be used for network traffic from one or more NFs of the MNO to the other CSP network instead of an ASN of the cloud computing service provider, in accordance with embodiments described herein.

FIG. 4 illustrates a logical flow diagram showing an example embodiment of a process 400, useful in the process of FIG. 3, for causing the ASN of the MNO to be used for network traffic from one or more NFs of the MNO to the other CSP network instead of an ASN of the cloud computing service provider, in accordance with embodiments described herein.

At 402, the MNO 208 causes network traffic from the one or more NFs running within the public cloud to be routed to a virtual router (vRouter) controlled by the MNO within the public cloud of the cloud computing service provider.

At 404, the MNO 208 causes the network traffic from the one or more NFs received at the vRouter to be originated from the vRouter controlled by the MNO to send to the CSP network, so that the ASN of the MNO is used for network traffic from the one or more NFs to the other CSP network instead of an ASN of the cloud computing service provider.

At 406, the MNO 208 routes the network traffic from the one or more originated from the vRouter to the other CSP network using the ASN of the MNO via one or more routers controlled by the MNO that are connected to, but outside, the public cloud of the cloud computing service provider.

Figure 5:
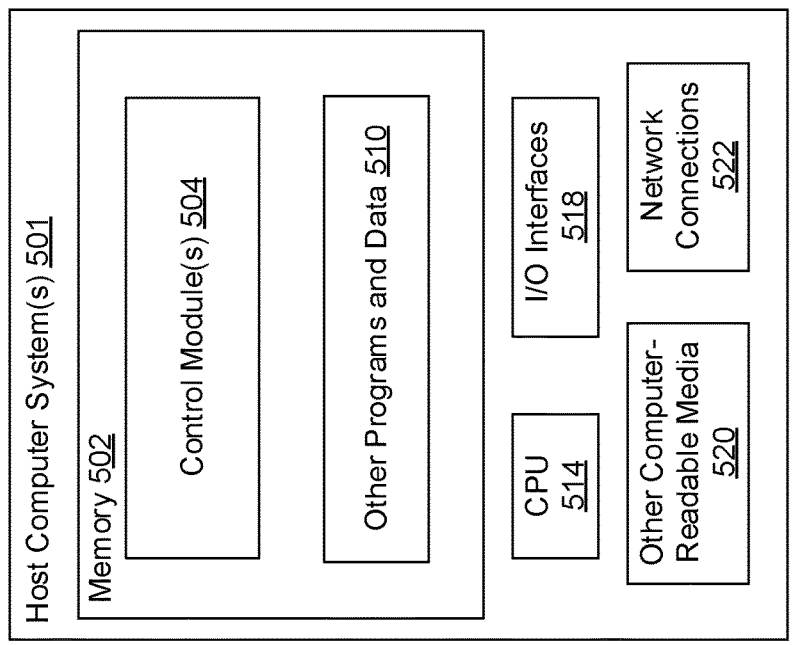
FIG. 5 shows a system diagram that describes an example implementation of computing system(s) for implementing embodiments described herein.

FIG. 5 shows a system diagram that describes an example implementation of computing system(s) 500 for implementing embodiments described herein.

The functionality described herein for usage of a wireless telecommunication service provider ASN in a cloud-native 5G wireless telecommunication network can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 5 illustrates an example of underlying hardware on which such software and functionality may be hosted and/or implemented.

In particular, shown is example host computer system(s) 501. For example, such computer system(s) 501 may represent one or more of those in various data centers, base stations and cell sites shown and/or described herein that are, or that host or implement the functions of: routers, components, microservices, nodes, node groups, control planes, clusters, virtual machines, NFs, and other aspects described herein for usage of a wireless telecommunication service provider ASN in a cloud-native 5G wireless telecommunication network. In some embodiments, one or more special-purpose computing systems may be used to implement the functionality described herein. Accordingly, various embodiments described herein may be implemented in software, hardware, firmware, or in some combination thereof. Host computer system(s) 501 may include memory 502, one or more central processing units (CPUs) 514, I/O interfaces 518, other computer-readable media 520, and network connections 522.

Memory 502 may include one or more various types of non-volatile and/or volatile storage technologies. Examples of memory 502 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 502 may be utilized to store information, including computer-readable instructions that are utilized by CPU 514 to perform actions, including those of embodiments described herein.

Memory 502 may have stored thereon control module(s) 1804. The control module(s) 1804 may be configured to implement and/or perform some or all of the functions of the systems, components and modules described herein for usage of a wireless telecommunication service provider ASN in a cloud-native 5G wireless telecommunication network. Memory 502 may also store other programs and data 510, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 522 are configured to communicate with other computing devices to facilitate the functionality described herein. In various embodiments, the network connections 522 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 518 may include a video interfaces, other data input or output interfaces, or the like. Other computer-readable media 520 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a fifth generation (5G) cloud-native wireless telecommunication network operated by a mobile network operator (MNO) implemented on a public cloud of a cloud computing service provider, the method comprising:
   the MNO operating telecommunication network functions (NFs) of the 5G wireless telecommunication network running within the public cloud;
   receiving an indication that one or more of the NFs of the 5G wireless telecommunication network running within the public cloud has a requirement to connect to another communication service provider (CSP) network different than the 5G cloud-native wireless telecommunication network operated by the MNO; and
   based on the indication, causing an autonomous system number (ASN) of the MNO to be used for network traffic from the one or more NFs to the other CSP network instead of an ASN of the cloud computing service provider.

2. The method of claim 1, wherein the causing the ASN of the MNO to be used for network traffic from the one or more NFs to the other CSP network instead of an ASN of the cloud computing service provider includes:
   causing network traffic from the one or more NFs running within the public cloud to be routed to a virtual router (vRouter) controlled by the MNO within the public cloud of the cloud computing service provider;
   causing the network traffic from the one or more NFs received at the vRouter to be originated from the vRouter controlled by the MNO to send to the CSP network, so that the ASN of the MNO is used for network traffic from the one or more NFs to the other CSP network instead of an ASN of the cloud computing service provider; and
   routing the network traffic from the one or more originated from the vRouter to the other CSP network using the ASN of the MNO via one or more routers controlled by the MNO that are connected to, but outside, the public cloud of the cloud computing service provider.

3. The method of claim 1 wherein the causing the ASN of the MNO to be used for network traffic from the one or more NFs to the other CSP network instead of the ASN of the cloud computing service provider is further based on a requirement received from the other CSP network that the MNO use the ASN of the MNO in order for the MNO to interconnect with the other CSP network.

4. A system in in a fifth generation (5G) cloud-native wireless telecommunication network operated by a mobile network operator (MNO) implemented on a public cloud of a cloud computing service provider, the system comprising:
    at least one memory that stores computer executable instructions; and
    at least one processor that executes the computer executable instructions to cause actions to be performed, the actions including:
        the MNO operating telecommunication network functions (NFs) of the 5G wireless telecommunication network running within the public cloud;
        receiving an indication that one or more of the NFs of the 5G wireless telecommunication network running within the public cloud has a requirement to connect to another communication service provider (CSP) network different than the 5G cloud-native wireless telecommunication network operated by the MNO; and
        based on the indication, causing an autonomous system number (ASN) of the MNO to be used for network traffic from the one or more NFs to the other CSP network instead of an ASN of the cloud computing service provider.

5. The system of claim 4, wherein the causing the ASN of the MNO to be used for network traffic from the one or more NFs to the other CSP network instead of an ASN of the cloud computing service provider includes:
    causing network traffic from the one or more NFs running within the public cloud to be routed to a virtual router (vRouter) controlled by the MNO within the public cloud of the cloud computing service provider;
    causing the network traffic from the one or more NFs received at the vRouter to be originated from the vRouter controlled by the MNO to send to the CSP network, so that the ASN of the MNO is used for network traffic from the one or more NFs to the other CSP network instead of an ASN of the cloud computing service provider; and
    routing the network traffic from the one or more originated from the vRouter to the other CSP network using the ASN of the MNO via one or more routers controlled by the MNO that are connected to, but outside, the public cloud of the cloud computing service provider.

6. The system of claim 4 wherein the causing the ASN of the MNO to be used for network traffic from the one or more NFs to the other CSP network instead of the ASN of the cloud computing service provider is further based on a requirement received from the other CSP network that the MNO use the ASN of the MNO in order for the MNO to interconnect with the other CSP network.

7. A non-transitory computer-readable storage medium having computer-executable instructions stored thereon that, when executed by at least one processor, cause the at least one processor to cause actions to be performed in a fifth generation (5G) cloud-native wireless telecommunication network operated by a mobile network operator (MNO) implemented on a public cloud of a cloud computing service provider, the actions including:
    the MNO operating telecommunication network functions (NFs) of the 5G wireless telecommunication network running within the public cloud;
    receiving an indication that one or more of the NFs of the 5G wireless telecommunication network running within the public cloud has a requirement to connect to another communication service provider (CSP) network different than the 5G cloud-native wireless telecommunication network operated by the MNO; and
    based on the indication, causing an autonomous system number (ASN) of the MNO to be used for network traffic from the one or more NFs to the other CSP network instead of an ASN of the cloud computing service provider.

8. The non-transitory computer-readable storage medium of claim 7, wherein the causing the ASN of the MNO to be used for network traffic from the one or more NFs to the other CSP network instead of an ASN of the cloud computing service provider includes:
    causing network traffic from the one or more NFs running within the public cloud to be routed to a virtual router (vRouter) controlled by the MNO within the public cloud of the cloud computing service provider;
    causing the network traffic from the one or more NFs received at the vRouter to be originated from the vRouter controlled by the MNO to send to the CSP network, so that the ASN of the MNO is used for network traffic from the one or more NFs to the other CSP network instead of an ASN of the cloud computing service provider; and
    routing the network traffic from the one or more originated from the vRouter to the other CSP network using the ASN of the MNO via one or more routers controlled by the MNO that are connected to, but outside, the public cloud of the cloud computing service provider.

9. The non-transitory computer-readable storage medium of claim 7 wherein the causing the ASN of the MNO to be used for network traffic from the one or more NFs to the other CSP network instead of the ASN of the cloud computing service provider is further based on a requirement received from the other CSP network that the MNO use the ASN of the MNO in order for the MNO to interconnect with the other CSP network.

* * * * *